United States Patent
Watanabe et al.

(10) Patent No.: US 11,704,413 B2
(45) Date of Patent: Jul. 18, 2023

(54) ASSESSING LATENT SECURITY RISKS IN KUBERNETES CLUSTER

(71) Applicant: INTERNATIONAL BUSINESS MACHINES CORPORATION, Armonk, NY (US)

(72) Inventors: Yuji Watanabe, Chuouku (JP); Ruriko Kudo, Saitama (JP); Kugamoorthy Gajananan, Toshima-ku (JP); Hirokuni Kitahara, Sumida-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 233 days.

(21) Appl. No.: 17/237,241

(22) Filed: Apr. 22, 2021

(65) Prior Publication Data

US 2022/0342997 A1 Oct. 27, 2022

(51) Int. Cl.
| | |
|---|---|
| G06F 21/54 | (2013.01) |
| G06F 21/55 | (2013.01) |
| G06F 21/56 | (2013.01) |
| G06F 21/57 | (2013.01) |
| G06F 21/62 | (2013.01) |

(52) U.S. Cl.
CPC ............ *G06F 21/577* (2013.01); *G06F 21/54* (2013.01); *G06F 21/56* (2013.01); *G06F 21/62* (2013.01)

(58) Field of Classification Search
CPC ........ G06F 21/577; G06F 21/54; G06F 21/56; G06F 21/62; G06F 21/55; G06F 21/57
See application file for complete search history.

(56) References Cited

U.S. PATENT DOCUMENTS

| | | | |
|---|---|---|---|
| 10,817,346 B1 * | 10/2020 | Culp | G06F 9/5072 |
| 2018/0367528 A1 | 12/2018 | Schwarz et al. | |
| 2021/0397729 A1 * | 12/2021 | McQuaid | G06F 9/45558 |

FOREIGN PATENT DOCUMENTS

| | | | | |
|---|---|---|---|---|
| CN | 109413065 A | | 3/2019 | |
| CN | 112887290 A | * | 6/2021 | H04L 63/10 |

(Continued)

OTHER PUBLICATIONS

"Kubernetes: ServiceAccounts, JWT-tokens, authentication, and RBAC authorization"—by Arseny Zinchenko—ITNEXT Publication. (Year: 2020).*

(Continued)

*Primary Examiner* — Jayesh M Jhaveri
(74) *Attorney, Agent, or Firm* — Tutunjian & Bitetto, P.C.; Randy Emilio Tejeda

(57) ABSTRACT

A computer-implemented method for assessing latent security risks in Kubernetes clusters is provided including selecting a service account from a plurality of service accounts defined in namespaces of a cluster, binding a role to the selected service account based on predetermined role-binding data, and determining if the role meets at least one of a first, second, and third conditions based on predetermined role data defining permitted operations for roles, the first condition being that the role can receive secret tokens for pods within a namespace of the namespaces, the second condition being that the role can perform execution operation to other pods, and the third condition being that the role can create DaemonSet, Deployment, StatefulSet, and additional pods on the namespace.

20 Claims, 11 Drawing Sheets

(56) References Cited

FOREIGN PATENT DOCUMENTS

| CN | 114143069 A | * | 3/2022 | |
|---|---|---|---|---|
| CN | 114679380 A | * | 6/2022 | |
| CN | 115185697 A | * | 10/2022 | |
| EP | 4160412 A1 | * | 4/2023 | ............. G06F 9/547 |

OTHER PUBLICATIONS

Gerzi, Eviatar, "Securing Kubernetes Clusters by Eliminating Risky Permissions", HTTPS://WWW.cyberark.com/resources/customer-stories. Dec. 12, 2018. pp. 1-19.

* cited by examiner

ASSESSING LATENT SECURITY RISKS IN KUBERNETES CLUSTER

BACKGROUND

The present invention relates generally to preventing privilege escalation, and more specifically, to assessing latent security risks in Kubernetes clusters.

Kubernetes is a portable, extensible, open-source platform for managing containerized workloads and services that facilitates both declarative configuration and automation. Kubernetes provides a platform for automating deployment, scaling, and operations of application containers across clusters of hosts. Kubernetes works with a range of container tools and runs containers in a cluster, often with images built using Docker. Kubernetes defines a set of building blocks, which collectively provide mechanisms that deploy, maintain, and scale applications based on central processing unit (CPU), memory or custom metrics. Kubernetes is extensible to meet different workloads. This extensibility is provided in large part by the Kubernetes application programming interface (API), which is used by internal components as well as extensions and containers that run on Kubernetes.

SUMMARY

In accordance with an embodiment, a computer-implemented method for assessing latent security risks in Kubernetes clusters is provided. The computer-implemented method includes selecting a service account from a plurality of service accounts defined in namespaces of a cluster, binding a role to the selected service account based on predetermined role-binding data, and determining if the role meets at least one of a first, second, and third conditions based on predetermined role data defining permitted operations for roles, the first condition being that the role can receive secret tokens for pods within a namespace of the namespaces, the second condition being that the role can perform execution operation to other pods, and the third condition being that the role can create DaemonSet, Deployment, StatefulSet, and additional pods on the namespace.

In accordance with another embodiment, a computer program product for assessing latent security risks in Kubernetes clusters is provided. The computer program product includes a computer readable storage medium having program instructions embodied therewith, the program instructions executable by a computer to cause the computer to select a service account from a plurality of service accounts defined in namespaces of a cluster, bind a role to the selected service account based on predetermined role-binding data, and determine if the role meets at least one of a first, second, and third conditions based on predetermined role data defining permitted operations for roles, the first condition being that the role can receive secret tokens for pods within a namespace of the namespaces, the second condition being that the role can perform execution operation to other pods, and the third condition being that the role can create DaemonSet, Deployment, StatefulSet, and additional pods on the namespace.

In accordance with yet another embodiment, a computer-implemented method for determining unintended expansion of privileges for all service accounts defined in all namespaces on a cluster is provided. The computer-implemented method includes identifying a plurality of roles which a service account is binding to, identifying roles from the plurality of roles that meet one of three conditions, identifying a plurality of service accounts that the roles can pretend to be, repeating all the identifying steps to determine all service accounts and roles pretended by the service account, and triggering an alert if the determined roles in the repeating step have more privileges than the service account.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
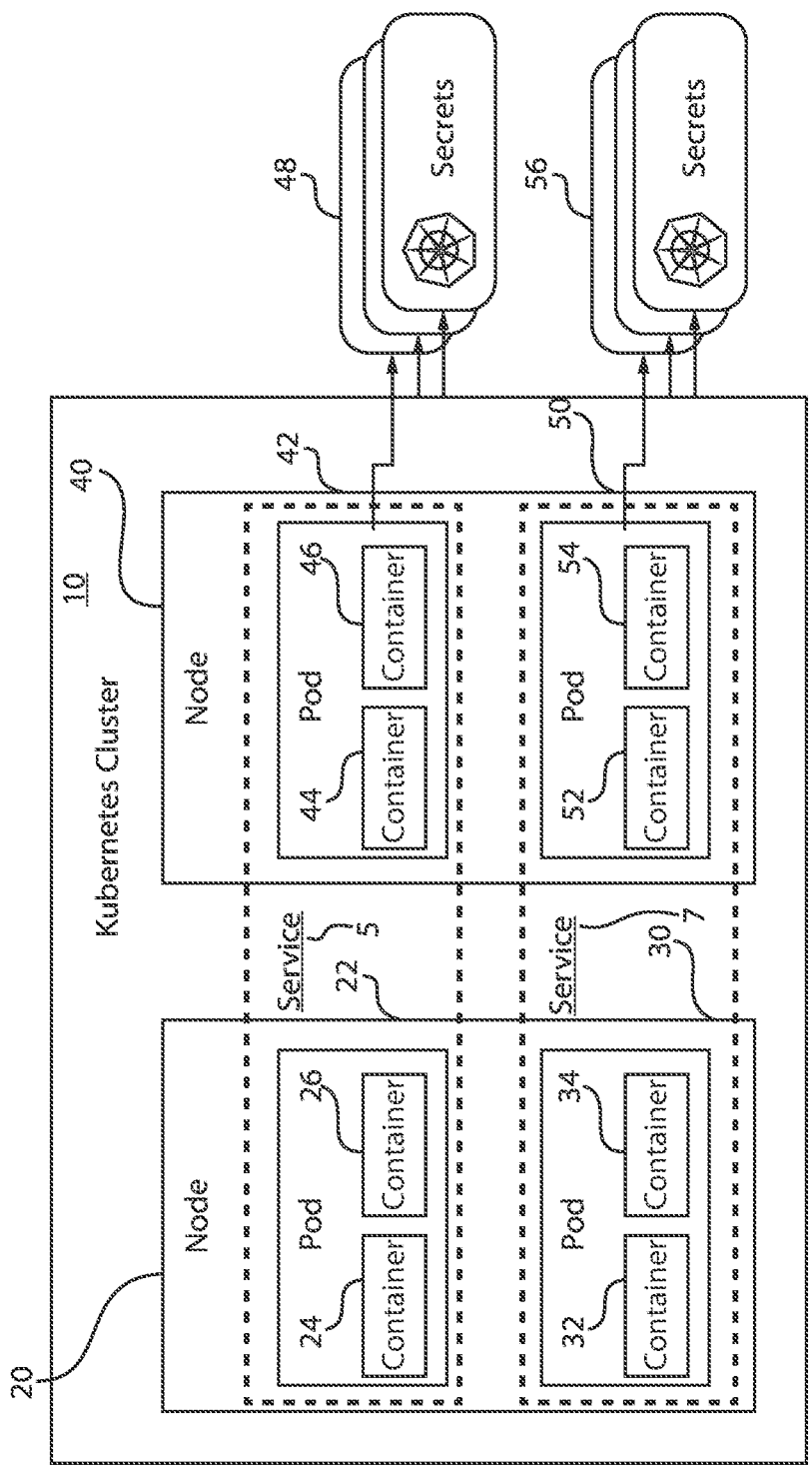
FIG. 1 shows an exemplary Kubernetes Cluster illustrating a relationship between clusters, nodes, Pods, containers, and secret tokens, in accordance with an embodiment of the present invention.

Embodiments in accordance with the present invention provide methods and devices for assessing latent security risks in Kubernetes clusters. Role-based Access Control (RBAC) is used for controlling user access to resources on Kubernetes clusters. In particular, RBAC is a method of restricting network access based on the roles of individual users within an enterprise. RBAC lets users have access rights only to the information they need to do their jobs and prevents them from accessing information that doesn't pertain to them. A Pod including a plurality of containers uses a functional user ID called a service account (SA) and a secret token for the SA is attached to the Pod in an unencrypted form. If an unauthorized individual knows the secret token, that unauthorized individual can pretend to be the SA because the secret token is not encrypted in the Pod. The RBAC controls access to the Pod, but cannot prevent unauthorized individuals or attackers from pretending to be the SA. The exemplary embodiments of the present invention identify and eliminate the risks in role definition against attackers or unauthorized individuals pretending to be the SA. In other words, the exemplary embodiments of the present invention find latent access patterns automatically by analyzing roles and permissions, and detect instances of unintended expansion of privileges.

Modern applications are increasingly being built by using containers, which are microservices packaged with their dependencies and configurations. Microservices, also known as microservice architectures, is an architectural style that structures an application as a collection of services that are highly maintainable and testable, loosely coupled, independently deployable, organized around business capabilities, and owned by a small team. The microservice architecture enables the rapid, frequent and reliable delivery of large, complex applications.

Kubernetes is open-source software for deploying and managing containers at scale. As applications grow to span multiple containers deployed across multiple servers, operating them becomes more complex. To manage this complexity, Kubernetes provides an open source application programming interface (API) that controls how and where those containers will run. Kubernetes orchestrates clusters of virtual machines and schedules containers to run on those virtual machines based on their available compute resources and the resource requirements of each container. Containers are grouped into Pods, the basic operational unit for Kubernetes, and those Pods scale to a user's desired state. Kubernetes also automatically manages service discovery, incorporates load balancing, tracks resource allocation, and scales based on compute utilization. Further, Kubernetes checks the health of individual resources and enables apps to self-heal by automatically restarting or replicating containers. Keeping containerized apps up and running can be complex because they often involve many containers deployed across different machines. Kubernetes, however, provides a way to schedule and deploy those containers and scale them to a user's desired state and manage their lifecycles.

Embodiments in accordance with the present invention provide methods and devices for assessing latent security risks in Kubernetes clusters by executing the following methodology for all service accounts (SA) defined in all namespaces (NS) on a cluster. Identify the list of roles (or Cluster Roles) which SA is binding to. Identify roles which meet one of the following conditions: a) "GET secret" is permitted, b) "CREATE pods/exec" is permitted, and c) "CREATE daemonset, deployment, statefulset, pod" is permitted. Then, identify the list of service accounts which the role can pretend to be. For example, a) implies or suggest the role can pretend to be any service accounts on the namespace, b) implies or suggest the role can pretend to be service account used in the pod, and c) implies or suggest the role can pretend to be any service accounts on the namespace. Repeat the three identifying steps, and then identify all the service accounts and roles which can be pretended by SA. Finally, provide or trigger a notification or alert if the roles in the last identifying step has more privileges than the original or initial SA. Therefore, the exemplary embodiments compute all permissions which are potentially accessible to the SA with the consideration of access to secret tokens in the Pods and alert risky privilege assignments to service accounts on cluster automatically. In other words, the exemplary embodiments of the present invention find latent access patterns automatically by analyzing roles and permissions, and detect instances of unintended expansion of privileges.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 shows an exemplary Kubernetes Cluster illustrating a relationship between clusters, nodes, Pods, containers, and secret tokens, in accordance with an embodiment of the present invention.

A Kubernetes cluster 10 includes one or more nodes. In FIG. 1 Kubernetes cluster 10 includes a first node 20 and a second node 40. The nodes 20, 40 are machines (e.g., virtual machines (VMs), physical servers, etc.) that run the applications. Each node 20, 40 includes a plurality of Pods. The first node 20 can include a first Pod 22 and a second Pod 30. The second node 40 can include a first Pod 42 and a second Pod 50. A Pod is the smallest Kubernetes object that contains one or more containers, storage resources, network IP and other configurations. First Pod 22 of first node 20 can include containers 24, 26 and second Pod 30 of first node 20 can include containers 32, 34. Similarly, first Pod 42 of second node 40 can include containers 44, 46 and second Pod 50 of second node 40 can include containers 52, 54. A Service defines a set of Pods and how they are accessed. A first service 5 defines how Pods 22, 42 are accessed, whereas second service 7 defines how Pods 30, 50 are accessed. A Volume is a shared storage for containers, and many different types are supported. These Kubernetes objects are defined in YAML format in .yaml files. A command line interface tool, "kubectl," is used to manage these objects via the Kubernetes API.

Each of the Pods can include secret tokens. For example, Pod 42 includes secret tokens 48 and Pod 50 includes secret tokens 56. Kubernetes Secrets allows a user to store and manage sensitive information, such as passwords, OAuth tokens, and secure shell (SSH) keys. OAuth is an authentication protocol that allows a user to approve one application interacting with another on the user's behalf without giving away the user password. A Secret is an object that includes a small amount of sensitive data such as a password, a token, or a key. Such information might otherwise be put in a Pod specification or in an image. Storing confidential information in a Secret is safer and more flexible than putting it verbatim in a Pod definition or in a container image.

Kubernetes authorizes API requests using the API server. Kubernetes evaluates all of the request attributes against all policies and allows or denies the request. All parts of an API request must be allowed by some policy in order to proceed. This means that permissions are denied by default. Kubernetes includes a built-in role-based access control (RBAC) mechanism that enables a user to configure fine-grained and specific sets of permissions that define how a given Google Cloud user, or group of users, can interact with any Kubernetes object in a cluster, or in a specific Namespace of a cluster. Kubernetes RBAC is enabled by default.

Containers are an alternative to virtual machines for helping developers to build, ship, deploy, and instantiate applications. A container is a set of processes that are isolated from the rest of the machine encapsulating its dependencies. Containers run in isolation, sharing an operating system (OS) instance. Containers do not need an entire guest operating system, making containers lighter by an order of magnitude compared to virtual machines. As containers can start in a matter of seconds, more quickly than virtual machines, containers are made to take a limited amount of resources (e.g., less than 2 GB of RAM) and scale to satisfy the demand. Containers are often used in microservices architectures where each container represents a service, connected to the other services through the network. This microservice architecture allows each component to be deployed and scaled independently of the others.

A deployment provides declarative updates for Pods and ReplicaSets. A deployment's primary purpose is to declare how many replicas of a Pod should be running at a time. When a deployment is added to the cluster, it will automatically spin up the requested number of Pods, and then monitor them. If a Pod dies, the deployment will automatically re-create it. Pods are the smallest deployable units of computing that can be created and managed in Kubernetes. A Pod is a group of one or more containers, with shared storage and network resources, and a specification for how to run the containers. A Pod's contents are always co-located and co-scheduled, and run in a shared context. A Pod models an application-specific "logical host," that is, it includes one or more application containers which are relatively tightly coupled. A workload is an application running on Kubernetes. Whether the workload is a single component or several that work together, on Kubernetes workloads run inside a set of Pods. Kubernetes is a portable, extensible, open-source platform for managing containerized workloads and services, that facilitates both declarative configuration and automation. A Kubernetes cluster includes the components that represent the control plane and a set of machines referred to as nodes. A node may be a virtual or physical machine, depending on the cluster. Each node is managed by the control plane and includes the services necessary to run Pods.

A deployment can be defined to create a ReplicaSet or to remove deployments and adopt all their resources with new deployments. When a deployment is revised, a ReplicaSet is created that describes the state that desired. During a rollout, the deployment controller changes the actual state to the state desired at a controlled rate. Each deployment revision can also be rolled back. Deployments can also be scaled. A ReplicaSet is a set of Pod templates that describes a set of Pod replicas. ReplicaSet uses a template that describes what each Pod must include. The ReplicaSet ensures that a specified number of Pod replicas are running at any time.

Figure 2:
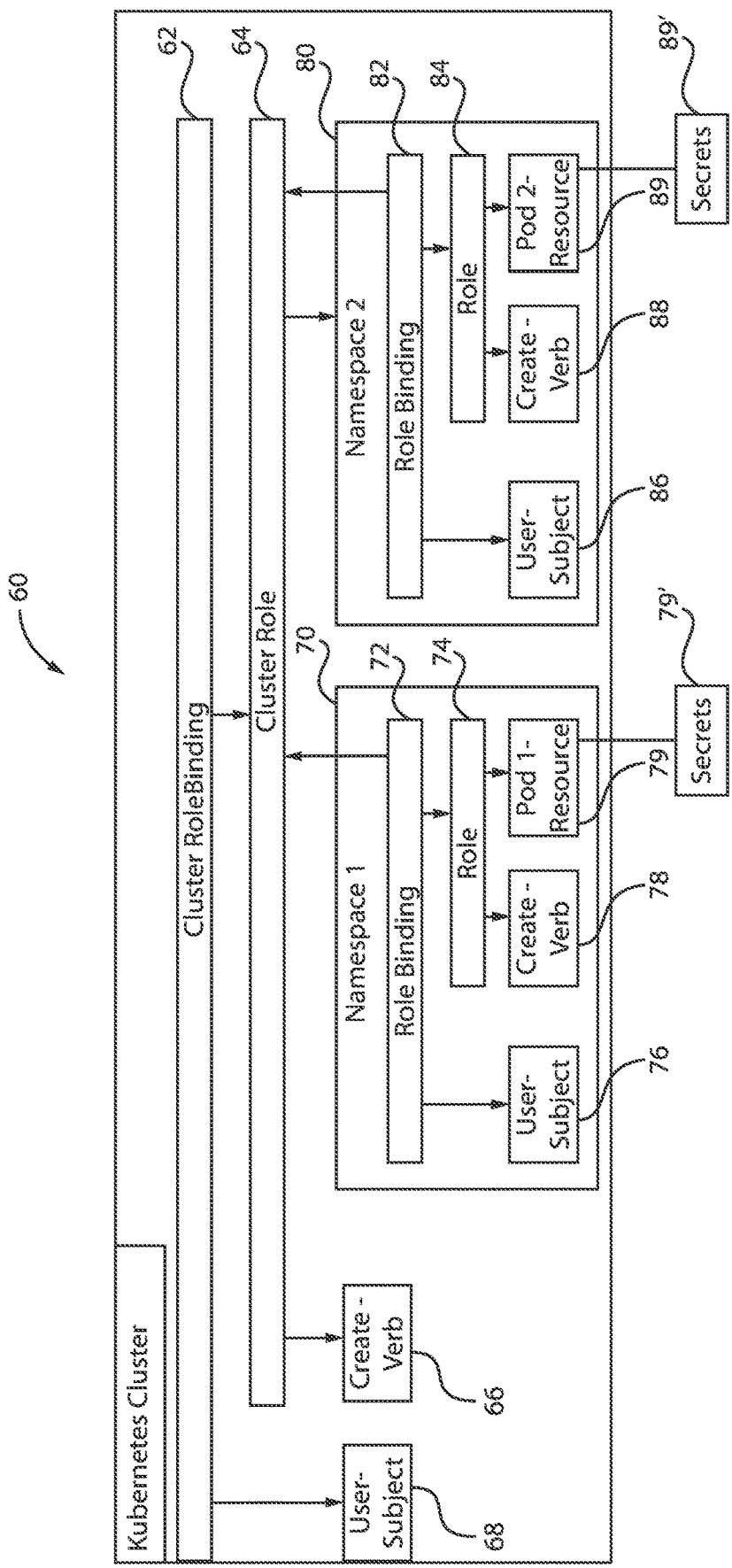
FIG. 2 shows an exemplary Kubernetes Cluster illustrating a relationship between Role Binding and Cluster Role Binding, as well as introducing terms such as namespace, role, resources, and verbs in the context of a Kubernetes environment, in accordance with an embodiment of the present invention.

FIG. 2 shows an exemplary Kubernetes Cluster illustrating a relationship between Role Binding and Cluster Role Binding, as well as introducing terms such as namespace, role, resources, and verbs in the context of a Kubernetes environment, in accordance with an embodiment of the present invention.

The Kubernetes Cluster 60 illustrates role-based security, where the cluster is broken up into namespaces to limit access to namespaced resources to specific accounts. To support this, Kubernetes includes a number of resources, including roles, Cluster Roles, Role Bindings, and Cluster Role Bindings. At a high level, roles and Role Bindings are placed inside of and grant access to a specific namespace, while Cluster Roles and Cluster Role Bindings do not belong to a namespace and grant access across the entire cluster. Cluster roles do not belong to a namespace. This means the Cluster Role does not scope permission to a single namespace. However, when a Cluster Role is linked to a service account via a Role Binding, the Cluster Role permissions only apply to the namespace in which the Role Binding has been created.

As a result, roles and Role Bindings must exist in the same namespace, Role Bindings can exist in separate namespaces to service accounts, Role Bindings can link Cluster Roles, but they only grant access to the namespace of the Role Binding, Cluster Role Bindings link accounts to Cluster Roles and grant access across all resources, and Cluster Role Bindings cannot reference roles.

In view of such relationships, Kubernetes Cluster 60 illustrates a Cluster Role Binding 62, a Cluster Role 64, where the Cluster Role 64 communicates with two namespaces, that is, first namespace 70 and second namespace 80. The first namespace 70 includes Role Binding 72 and role 74 and the second namespace 80 includes Role Binding 82 and role 84. Kubernetes clusters further include subjects, resources, and verbs. Subjects are users or processes that need access to the Kubernetes API. Resources are the Kubernetes API objects that a user is granted access to. Verbs are a list of actions that can be taken on a resource. First namespace 70 depicts a subject 76, a verb 78, and a resource 79. Secret tokens 79' are associated with Pod 79. Similarly, second namespace 80 depicts a subject 86, a verb 88, and a resource 89. Secret tokens 89' are associated with Pod 89. Cluster Role 64 further communicates with verb 66 and Cluster Role Binding 62 communicates with subject 68.

In general, all Kubernetes clusters have two categories of users, that is, service accounts managed by Kubernetes, and normal users. Normal users are assumed to be managed by an outside, independent service. An administrator distributing private keys, a user store like Keystone or Google Accounts, even a file with a list of usernames and passwords. In this regard, Kubernetes does not have objects which represent normal user accounts. Normal users cannot be added to a cluster through an API call.

In contrast, service accounts are users managed by the Kubernetes API. They are bound to specific namespaces, and created automatically by the API server or manually through API calls. Service accounts are tied to a set of credentials stored as Secrets, which are mounted into Pods allowing in-cluster processes to talk to the Kubernetes API.

API requests are tied to either a normal user or a service account, or are treated as anonymous requests. This means every process inside or outside the cluster, from a human user typing "kubectl" on a workstation, to kubelets on nodes, to members of the control plane, must authenticate when making requests to the API server, or be treated as an anonymous user.

In Kubernetes, as illustrated in FIG. 2, user accounts and service accounts can only view and edit resources they have been granted access to. This access is granted through the use of Roles and RoleBindings. Roles and RoleBindings are bound to a particular namespace, which grant users the ability to view and/or edit resources within that namespace the Role provides them access to.

At a cluster scope, these are called ClusterRoles and ClusterRoleBindings. Granting a user a ClusterRole grants them access to view and/or edit resources across the entire cluster. It is also necessary to view and/or edit resources at the cluster scope (namespaces, resource quotas, nodes). ClusterRoles can be bound to a particular namespace through reference in a RoleBinding. The "admin," "edit," and "view" default ClusterRoles are commonly used in this manner.

A role essentially maps a name to a set of permissions that a user or service is allowed to perform on the cluster. Roles can be scoped to the entire cluster with the "ClusterRole" resource type, or to a specific namespace with the "Role" resource type.

The key distinction is that cluster-scoped roles can be specified once and used in any name space, whereas namespace-scoped roles have to be defined in each name space they are used in. Another consideration is that you need cluster administration privileges to install Cluster Roles, while namespace-scoped roles can be created by a user with sufficient privileges.

Role Bindings acts as the glue between roles and accounts. There are two variants with different scoping rules. The RoleBinding resource type may reference either a "ClusterRole" or a plain "Role," and grants those permissions to a user, service account, or group in a specific namespace. A ClusterRoleBinding resource grants permissions to an entity at the cluster level and it is unscoped, meaning that those permissions apply to any namespace.

Moreover, Kubernetes supports multiple virtual clusters backed by the same physical cluster. These virtual clusters are called namespaces. Kubernetes resources, such as pods and deployments, are logically grouped into a namespace. These groupings provide a way to logically divide a Kubernetes cluster and restrict access to create, view, or manage resources. Users can only interact with resources within their assigned namespaces. Namespaces are a way to divide cluster resources between multiple users.

Figure 3:
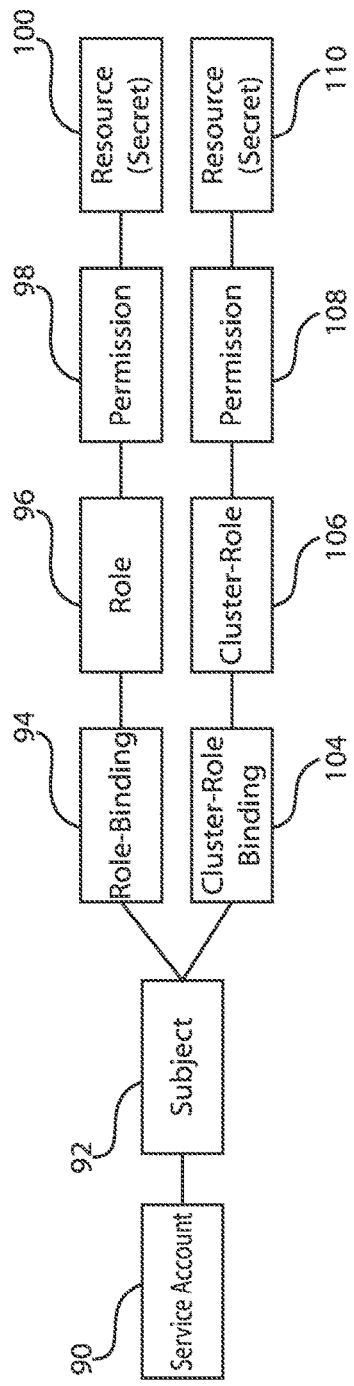
FIG. 3 is a block/flow diagram of an exemplary process for accessing resources (having secret tokens) via a service account, in accordance with an embodiment of the present invention.

FIG. 3 is a block/flow diagram of an exemplary process for accessing resources (having secret tokens) via a service account, in accordance with an embodiment of the present invention.

User accounts are for people, whereas service accounts are for processes, which run in Pods. User accounts are intended to be global. Names must be unique across all namespaces of a cluster. In contrast, service accounts are namespaced. A subject 92 may intend to access a service account 90. The service account 90 can have full permissions (verbs) on all objects (resources) in a single namespace. For example, a RoleBinding 94 with a Role 96 can be created having permissions 98 on all resources 100, where resources 100 can include secret tokens. Similarly, a Cluster RoleBinding 104 with a ClusterRole 106 can be created having permissions 108 on all resources 110, where resources 110 can include secret tokens. Thus, once the Role 96 and the ClusterRole 106 are created, the resources 100, 110 and the verbs 98, 108 are tied together. The subject 92 is tied to the Role 96 via RoleBinding 94 and the subject 92 is tied to the ClusterRole 106 via Cluster RoleBinding 104. The difference between the RoleBinding 94 and the Cluster RoleBinding 104 is whether or not its done at the namespace or for the entire cluster, as shown in FIG. 3.

Figure 4:
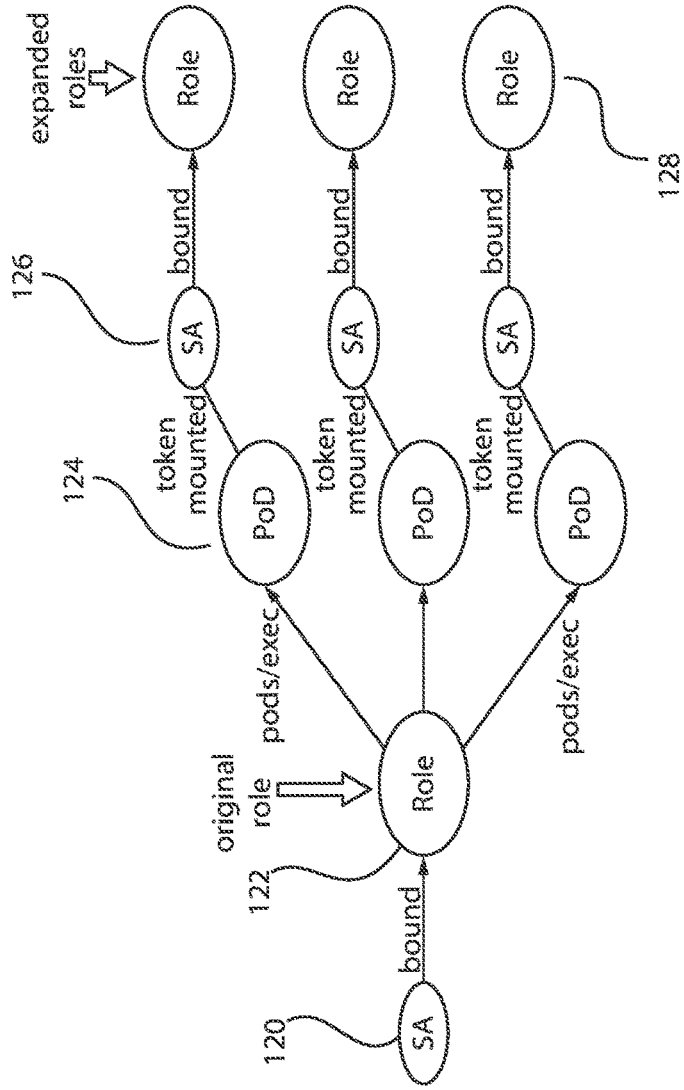
FIG. 4 is a block/flow diagram of an exemplary illustration of privilege escalation, in accordance with an embodiment of the present invention.

FIG. 4 is a block/flow diagram of an exemplary illustration of privilege escalation, in accordance with an embodiment of the present invention.

Privilege escalation happens when a malicious user exploits a bug, design flaw, or configuration error in an application or operating system to gain elevated access to resources that should normally be unavailable to that user. The attacker can then use the newly gained privileges to steal confidential data, run administrative commands or deploy malware and potentially do damage to the OS, server applications, organization, and reputation.

Attackers start by exploiting a privilege escalation vulnerability in a target system or application, which lets them override the limitations of the current user account. Attackers can then access the functionality and data of another user (horizontal privilege escalation) or obtain elevated privileges, usually of a system administrator or other power user (vertical privilege escalation). Such privilege escalation is generally just one of the steps performed in preparation for the main attack.

With horizontal privilege escalation, attackers remain on the same general user privilege level but can access data or functionality of other accounts or processes that should be unavailable to the current account or process. For example, this may mean using a compromised office workstation to gain access to other office users' data. For web applications, one example of horizontal privilege escalation might be getting access to another user's profile on a social site or e-commerce platform, or their bank account on an e-banking site.

Potentially more dangerous is vertical privilege escalation (also called privilege elevation), where the attacker starts from a less privileged account and obtains the rights of a more powerful user, usually the administrator or system user on Microsoft Windows, or root on Unix and Linux systems. With these elevated privileges, the attacker can wreak all sorts of havoc in computer systems and applications, e.g., steal access credentials and other sensitive information, download and execute malware, erase data, or execute arbitrary code. Skilled attackers can use elevated privileges to cover their tracks by deleting access logs and other evidence of their activity.

While usually not the main goal of an attacker, privilege escalation is frequently used in preparation for a more specific attack, allowing intruders to deploy a malicious payload or execute malicious code in the targeted system. This means that whenever privilege escalation id detected or suspected, a user also needs to look for signs of other malicious activity. However, even without evidence of further attacks, any privilege escalation incident is an information security issue in itself, because someone could have gained unauthorized access to personal, confidential or otherwise sensitive data. In many cases, this will have to be reported internally or to the relevant authorities to ensure compliance.

Referring back to FIG. 4, a service account 120 communicates with a Role 122 (also referred to as the original Role). The Role 122 can access resources 124 (that is Pods). Each of the Pods 124 can include secret tokens. Each Pod 124 can be associated with further service accounts 126. Each one of those service accounts 126 can be associated with further Roles, that is, expanded Roles 128. Permission for the original Role 122 includes any permissions for the expanded Roles 128. However, some permissions for the expanded Roles 128 are not assigned to the original Role 122. As such, such system is vulnerable to attackers.

Figure 5:
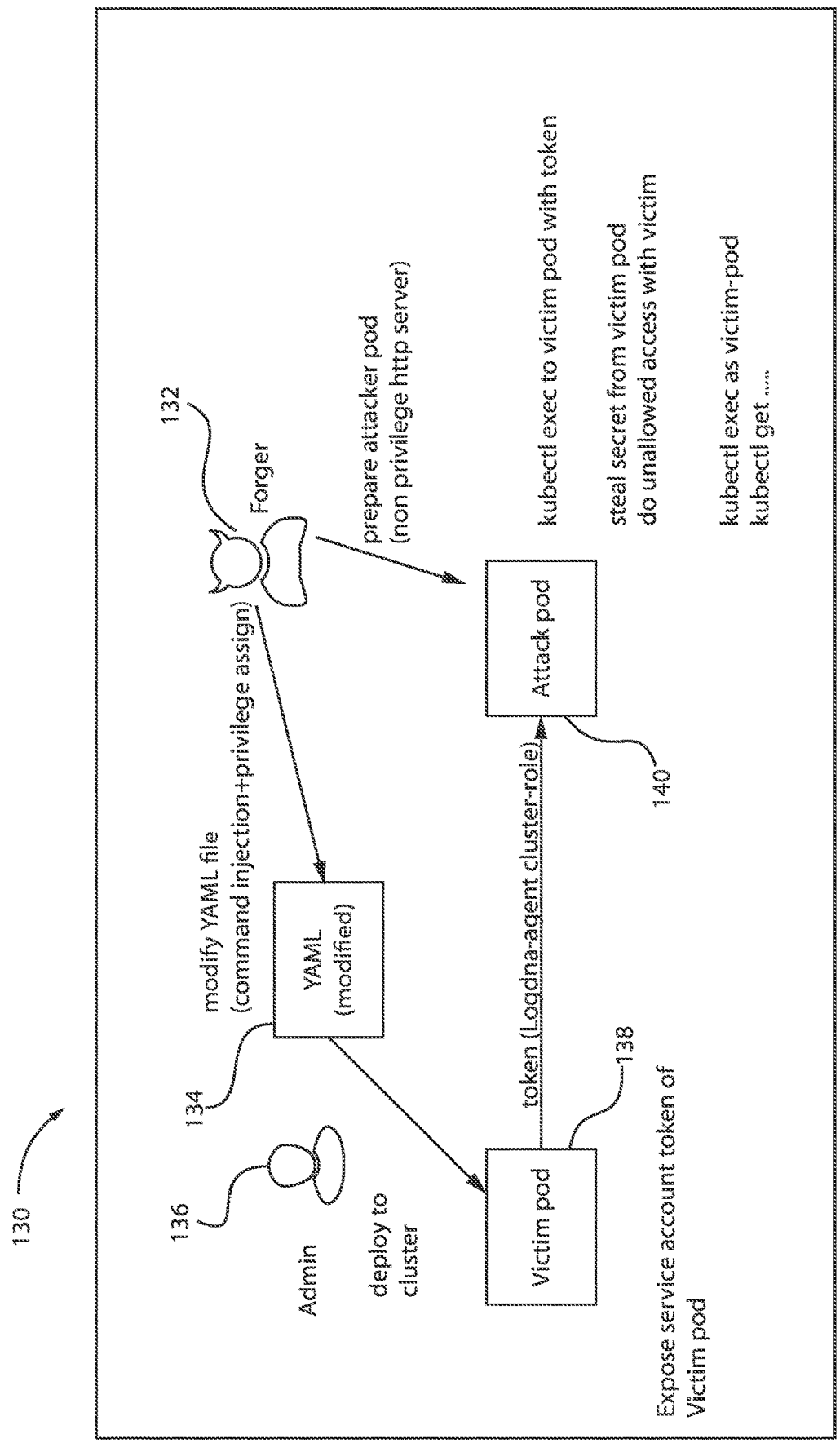
FIG. 5 is a block/flow diagram of an exemplary illustration of privilege escalation in a Kubernetes environment, in accordance with an embodiment of the present invention.

FIG. 5 is a block/flow diagram 130 of an exemplary illustration of privilege escalation in a Kubernetes environment, in accordance with an embodiment of the present invention.

In view of FIG. 4, an attacker or forger 132 may access a YAML file and attempt to modify such file (e.g., modified YAML file 134). The YAML file 134 can be deployed to a cluster including a plurality of Pods. The compromised Pod can be referred to as a Victim Pod 138, which includes the modified YAML file 134. The administrator 136 would not be aware of the Victim Pod 138 including the modified YAML file 134. As a result, the forger 132 can access the secret tokens of the Victim Pod 138, thus giving the forger 132 access to other Pods 140 (referred to as attack Pods). The forger 132 can thus compromise one Pod (i.e., the Victim Pod 138), and through that compromised Pod, steal secrets from the compromised Pod (i.e., the Victim Pod 138) and access further privileges enabled by Pod 140. The exemplary embodiments of the present invention can prevent such attacks by employing the methodology of FIG. 6.

Figure 6:
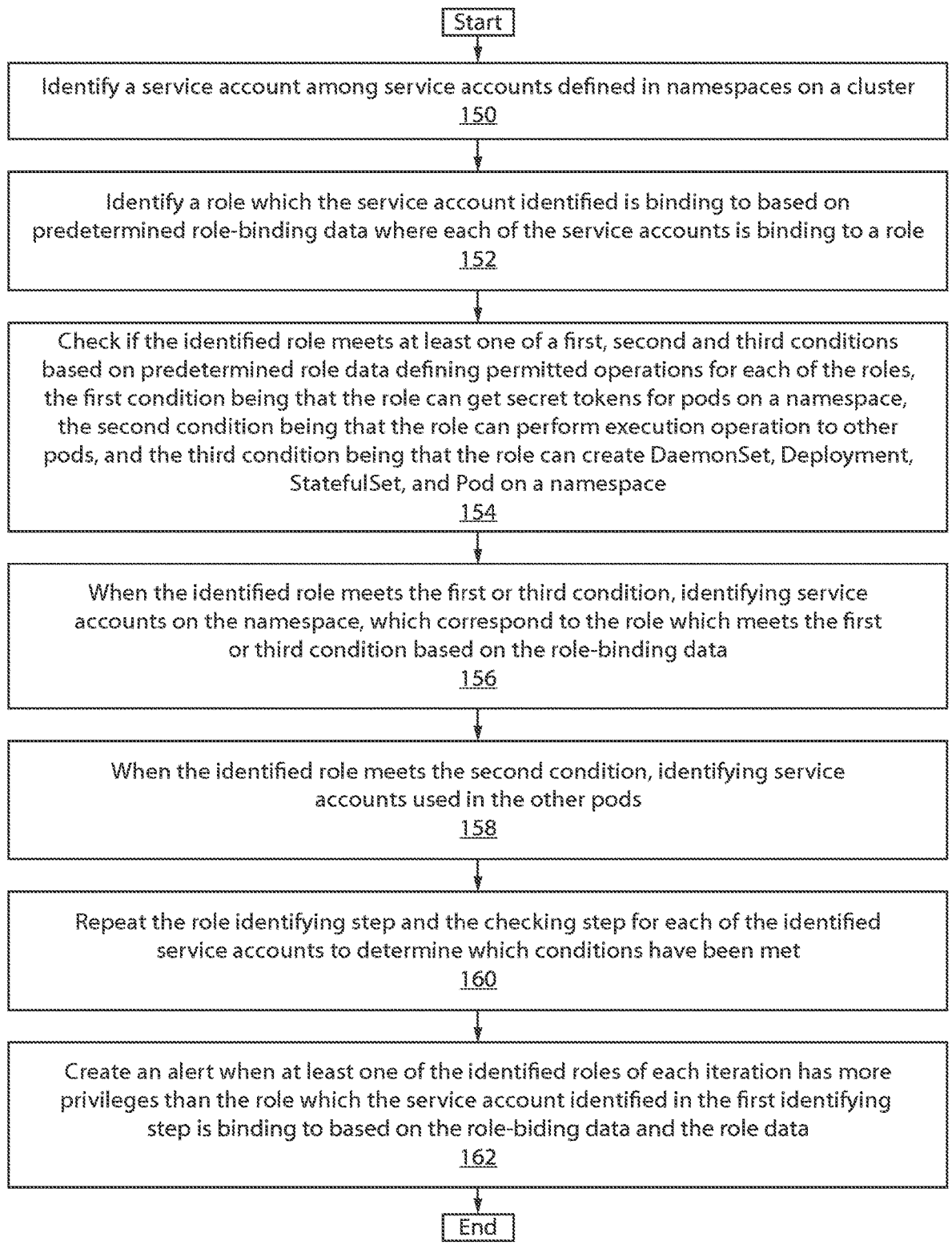
FIG. 6 is a block/flow diagram of an exemplary method for detecting attackers pretending to be a service account in a Kubernetes environment, in accordance with an embodiment of the present invention.

FIG. 6 is a block/flow diagram of an exemplary method for detecting attackers pretending to be a service account in a Kubernetes environment, in accordance with an embodiment of the present invention.

At block 150, identify a service account among service accounts defined in namespaces on a cluster.

At block 152, identify a role which the service account identified is binding to based on predetermined role-binding data where each of the service accounts is binding to a role.

At block 154, check if the identified role meets at least one of a first, second and third conditions based on predetermined role data defining permitted operations for each of the roles, the first condition being that the role can get secret tokens for pods on a namespace, the second condition being that the role can perform execution operation to other pods, and the third condition being that the role can create DaemonSet, Deployment, StatefulSet, and Pod on a namespace. A DaemonSet ensures that all (or some) nodes run a copy of a Pod. As nodes are added to the cluster, Pods are added to them. As nodes are removed from the cluster, those Pods are garbage collected. Deleting a DaemonSet will clean up the Pods it created. Some uses of a DaemonSet are running a cluster storage daemon on every node, running a logs collection daemon on every node, and running a node monitoring daemon on every node. StatefulSet is the workload API object used to manage stateful applications. StatefulSet manages the deployment and scaling of a set of Pods, and provides guarantees about the ordering and uniqueness of these Pods. Like a Deployment, a StatefulSet manages Pods that are based on an identical container spec. Unlike a Deployment, a StatefulSet maintains a sticky identity for each of their Pods. These Pods are created from the same spec, but are not interchangeable, that is, each has a persistent identifier that it maintains across any rescheduling. A Deployment provides declarative updates for Pods and ReplicaSets.

At block 156, when the identified role meets the first or third condition, identifying service accounts on the namespace, which correspond to the role which meets the first or third condition based on the role-binding data.

At block 158, when the identified role meets the second condition, identifying service accounts used in the other pods.

At block 160, repeat the role identifying step and the checking step for each of the identified service accounts to determine which conditions have been met.

At block 162, create an alert when at least one of the identified roles of each iteration has more privileges than the role which the service account identified in the first identifying step is binding to based on the role-biding data and the role data.

Assigning proper privileges is beneficial for protecting security of clusters, especially when the cluster runs mission critical workloads. Encrypting secrets and preventing unauthorized access are also key. RBAC provides baseline protection for the resources on Kubernetes cluster. For proper RBAC, the secret token for authenticating users' needs to be protected. Pods including secret tokens are unencrypted, and, thus, secret tokens can be leaked when direct access to the Pod is granted. The exemplary embodiments identify the latent access path to the secret token and provide alerts or notifications of any risks or unauthorized access by setting three conditions. When the Role meets one or more of the conditions that are set, the exemplary methods determine whether a Role has more privileges that the Role identified in the SA. In other words, the exemplary embodiments of the present invention find latent access patterns automatically by analyzing roles and permissions, and find unintended expansion of privileges.

Figure 7:
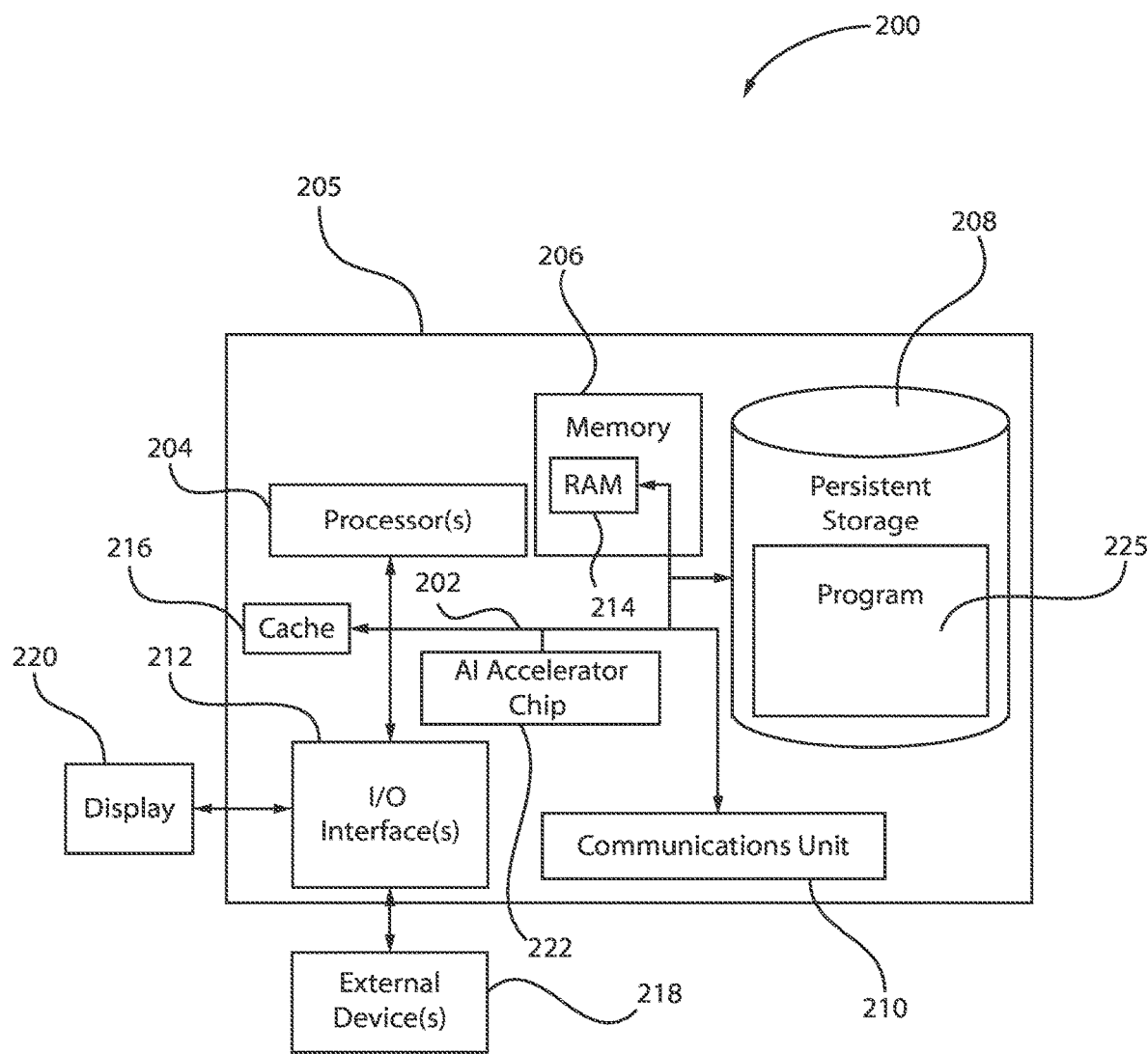
FIG. 7 is a block/flow diagram of an exemplary processing system employed in a Kubernetes environment, in accordance with an embodiment of the present invention.

FIG. 7 is a block/flow diagram of an exemplary processing system employed in a Kubernetes environment, in accordance with an embodiment of the present invention.

FIG. 7 depicts a block diagram of components of system 200, which includes computing device 205. It should be appreciated that FIG. 7 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, deep learning program 225 is included and operated by AI accelerator chip 222 as a component of computing device 205. In other embodiments, deep learning program 225 is stored in persistent storage 208 for execution by AI accelerator chip 222 in conjunction with one or more of the respective computer processors 204 via one or more memories of memory 206. In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Deep learning program 225 can be downloaded to persistent storage 208 through communications unit 210. I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 8:
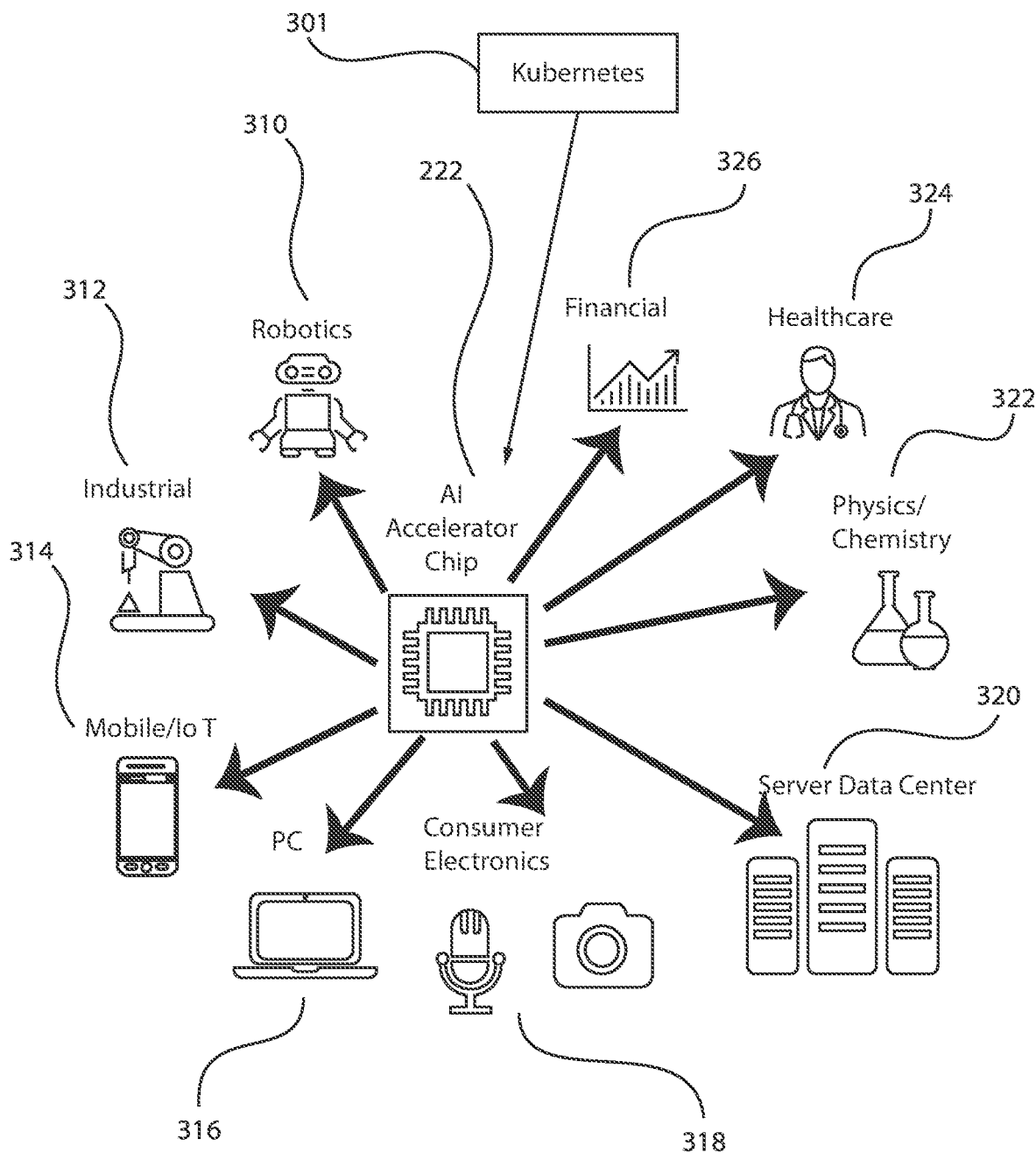
FIG. 8 illustrates practical applications for employing Kubernetes via an artificial intelligence (AI) accelerator chip, in accordance with an embodiment of the present invention.

FIG. 8 illustrates practical applications for employing Kubernetes via an artificial intelligence (AI) accelerator chip, in accordance with an embodiment of the present invention.

The artificial intelligence (AI) accelerator chip 222 can implement the Kubernetes 301, and can be used in a wide variety of practical applications, including, but not limited to, robotics 310, industrial applications 312, mobile or Internet-of-Things (IoT) 314, personal computing 316, consumer electronics 318, server data centers 320, physics and chemistry applications 322, healthcare applications 324, and financial applications 326.

For example, Robotic Process Automation or RPA 310 enables organizations to automate tasks, streamline processes, increase employee productivity, and ultimately deliver satisfying customer experiences. Through the use of RPA 310, a robot can perform high volume repetitive tasks, freeing the company's resources to work on higher value activities. An RPA Robot 310 emulates a person executing manual repetitive tasks, making decisions based on a defined set of rules, and integrating with existing applications. All of this while maintaining compliance, reducing errors, and improving customer experience and employee engagement.

Figure 9:
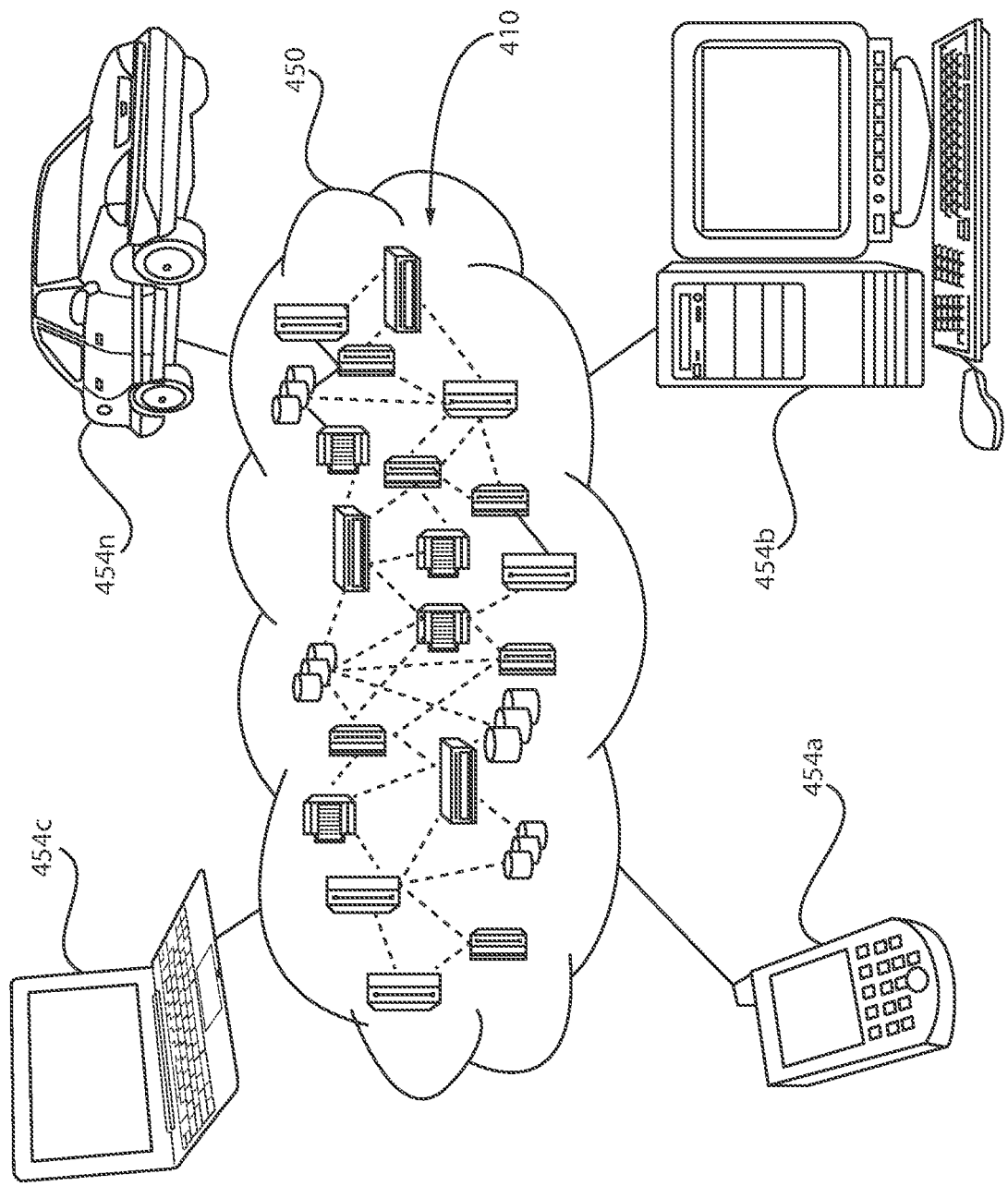
FIG. 9 is a block/flow diagram of an exemplary cloud computing environment, in accordance with an embodiment of the present invention.

FIG. 9 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 450 is depicted for enabling use cases of the present invention. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N can communicate. Nodes 410 can communicate with one another. They can be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 9 are intended to be illustrative only and that computing nodes 410 and cloud computing environment 450 can communicate with any type of computerized device over any type of network and/or network addressable connection (e.g., using a web browser).

Figure 10:
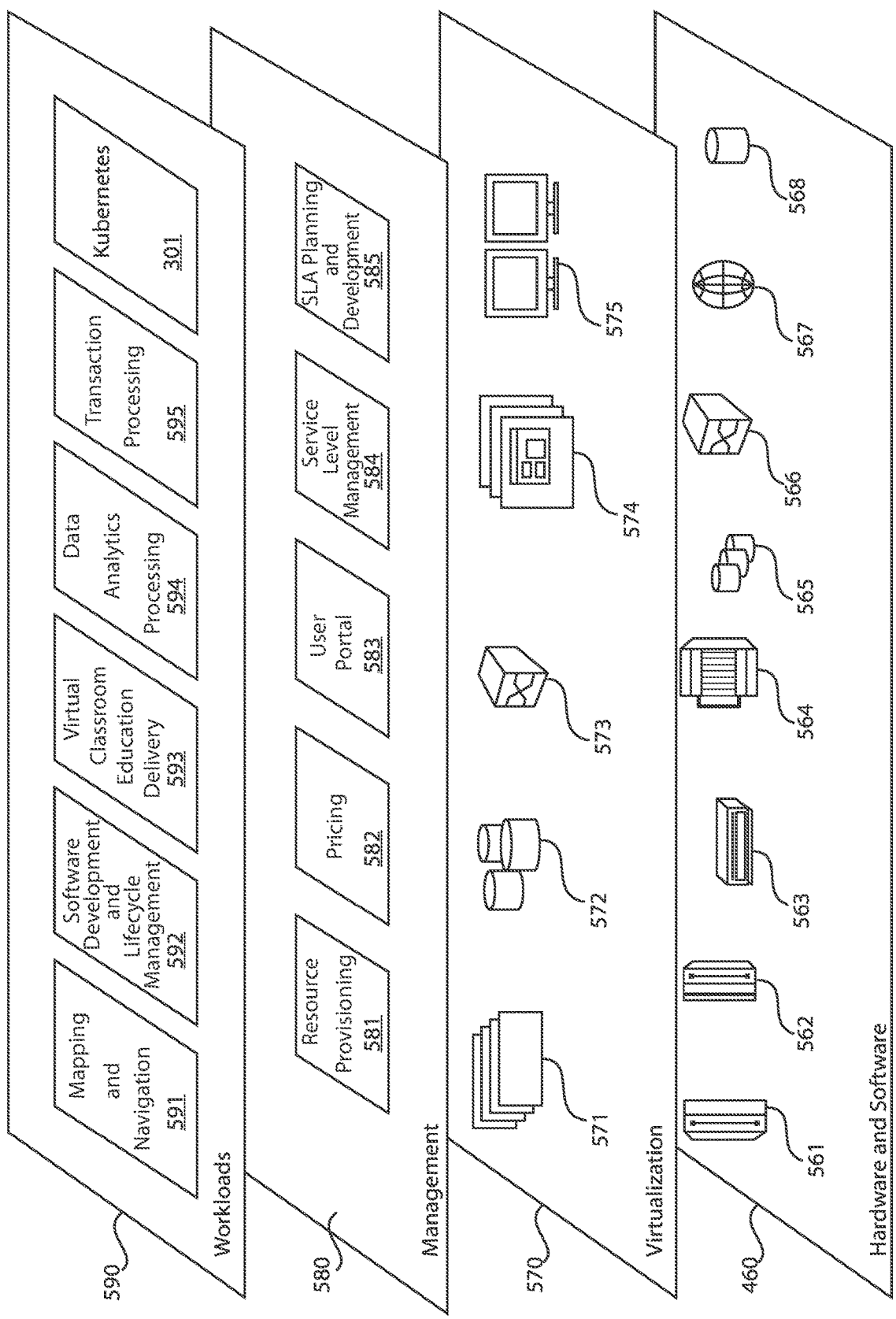
FIG. 10 is a schematic diagram of exemplary abstraction model layers, in accordance with an embodiment of the present invention.

FIG. 10 is a schematic diagram of exemplary abstraction model layers, in accordance with an embodiment of the present invention. It should be understood in advance that the components, layers, and functions shown in FIG. 10 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities can be provided: virtual servers 571; virtual storage 572; virtual networks 573, including virtual private networks; virtual applications and operating systems 574; and virtual clients 575.

In one example, management layer 580 can provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment can be utilized. Examples of workloads and functions which can be provided from this layer include: mapping and navigation 541; software development and lifecycle management 592; virtual classroom education delivery 593; data analytics processing 594; transaction processing 595; and Kubernetes 301.

Regarding Kubernetes and IoT, the combination of edge computing and the IoT relies on the ability to process some data on the small, lightweight hardware available on site (sensors, beacons, and cash registers, for example). That implementation is best done through containerization, the deployment of applications as small packages of code that include all the necessary components to run, such as configuration files, libraries, dependencies, and so on. That way, they can share a lightweight OS and yet run independently, making them suitable for deployment to distributed locations. Containerization also means the application packages are not dependent on the hardware, since everything they need is all packaged together. The open-source Kubernetes platform is a sort of master tool for managing containerized systems, that is deploying them across different machines, load balancing, and so on. With Kubernetes, a cluster of host machines can be managed by a "master" machine that coordinates among them. Kubernetes provides a common platform that could be used for deploying IoT services at the edge. Thus, Kubernetes can be leveraged in IoT applications, as further discussed below with reference to FIGS. 11 and 12.

Figure 11:
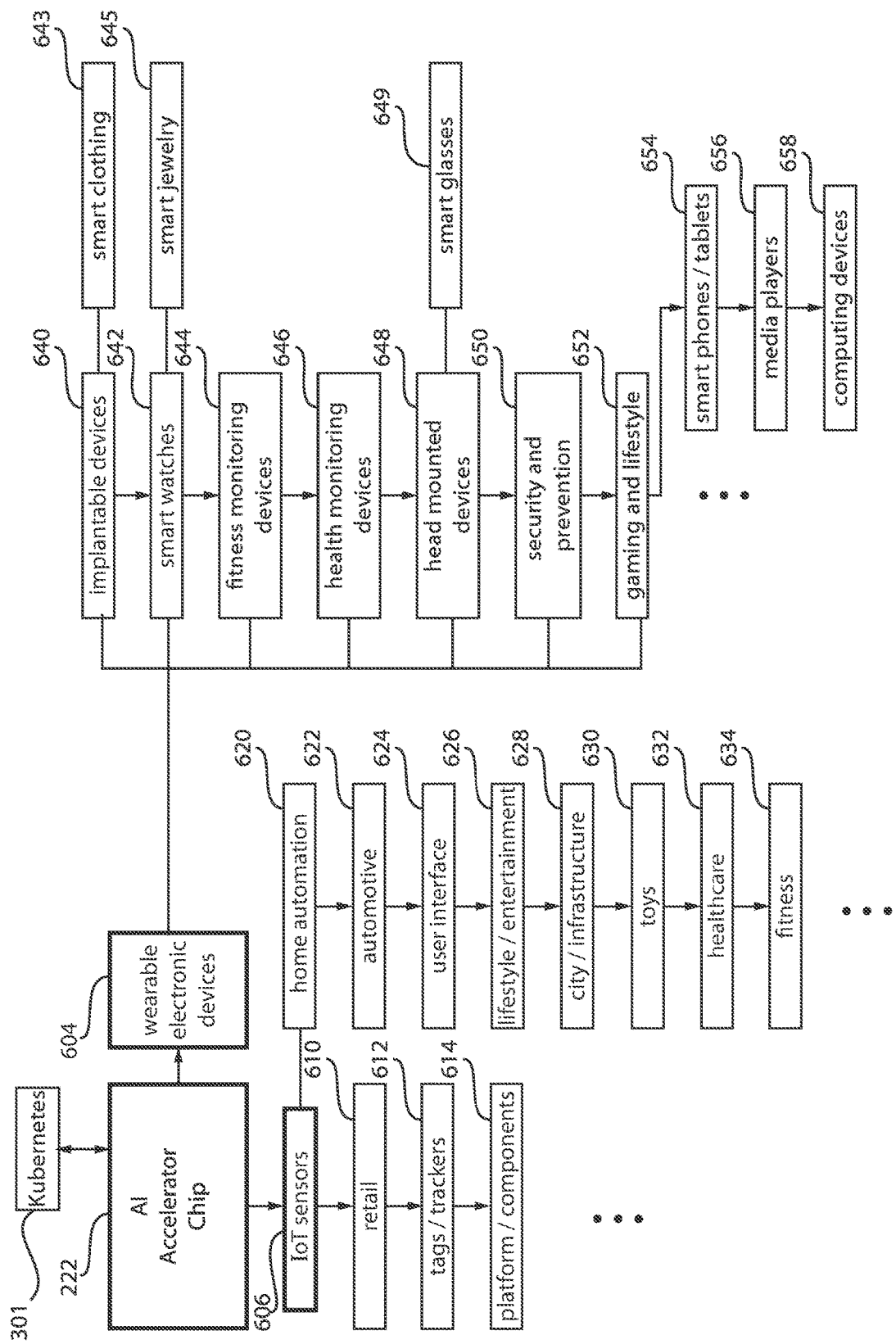
FIG. 11 is a block/flow diagram of a method for employing Kubernetes with Internet of Things (IoT) systems/devices/infrastructure, in accordance with an embodiment of the present invention.

FIG. 11 is a block/flow diagram of a method for employing Kubernetes with Internet of Things (IoT) systems/devices/infrastructure, in accordance with an embodiment of the present invention.

According to some embodiments of the invention, a network is implemented using an IoT methodology. For example, AI accelerator chip 222 can be incorporated implementing Kubernetes 301, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The AI accelerator chip 222 described herein can be incorporated into any type of electronic devices for any type of use or application or operation.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the AI accelerator chip 222 of the present invention can be incorporated into a variety of different devices and/or systems. For example, the AI accelerator chip 222 can be incorporated into wearable or portable electronic devices 604. Wearable/portable electronic devices 604 can include implantable devices 640, such as smart clothing 643. Wearable/portable devices 604 can include smart watches 642, as well as smart jewelry 645. Wearable/portable devices 604 can further include fitness monitoring devices 644, health and wellness monitoring devices 646, head-mounted devices 648 (e.g., smart glasses 649), security and prevention systems 650, gaming and lifestyle devices 652, smart phones/tablets 654, media players 656, and/or computers/computing devices 658.

The AI accelerator chip 222 of the present invention can be further incorporated into Internet of Thing (IoT) sensors 606 for various applications, such as home automation 620, automotive 622, user interface 624, lifestyle and/or entertainment 626, city and/or infrastructure 628, retail 610, tags and/or trackers 612, platform and components 614, toys 630, and/or healthcare 632, as well as fitness 634. The IoT sensors 606 can employ the AI accelerator chip 222. Of course, one skilled in the art can contemplate incorporating such AI accelerator chip 222 into any type of electronic devices for any types of applications, not limited to the ones described herein.

Figure 12:
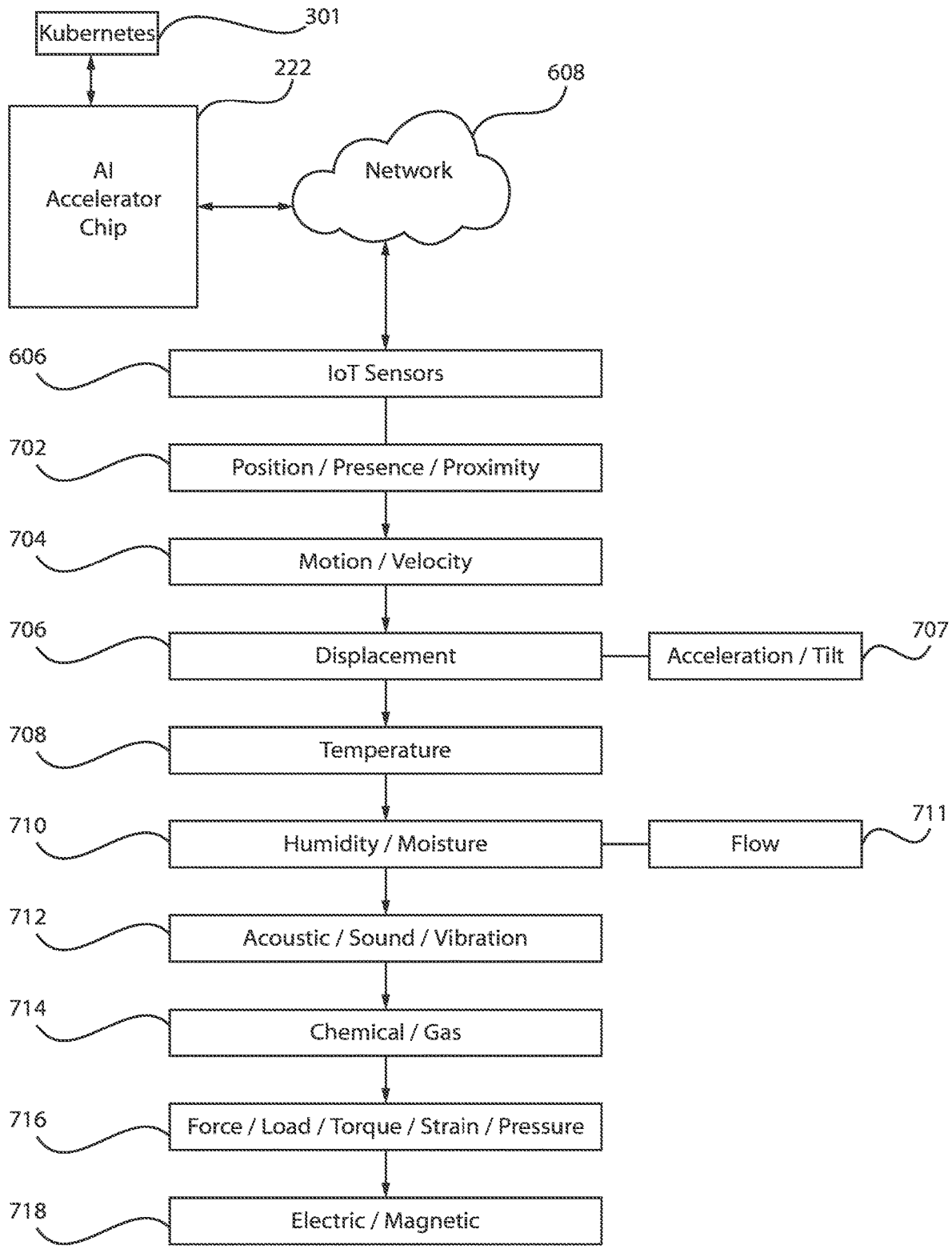
FIG. 12 is a block/flow diagram of exemplary IoT sensors used to collect data/information related to the Kubernetes operations via the AI accelerator chip, in accordance with an embodiment of the present invention.

FIG. 12 is a block/flow diagram of exemplary IoT sensors used to collect data/information related to the Kubernetes operations via the AI accelerator chip, in accordance with an embodiment of the present invention.

IoT loses its distinction without sensors. IoT sensors act as defining instruments which transform IoT from a standard passive network of devices into an active system capable of real-world integration.

The IoT sensors 606 can employ the AI accelerator chip 222 implementing Kubernetes 301 to transmit information or data, continuously and in in real-time, via a network 608, to any type of distributed system. Exemplary IoT sensors 606 can include, but are not limited to, position/presence/proximity sensors 702, motion/velocity sensors 704, displacement sensors 706, such as acceleration/tilt sensors 707, temperature sensors 708, humidity/moisture sensors 710, as well as flow sensors 711, acoustic/sound/vibration sensors 712, chemical/gas sensors 714, force/load/torque/strain/pressure sensors 716, and/or electric/magnetic sensors 718. One skilled in the art can contemplate using any combination of such sensors to collect data/information of the distributed system for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a method for assessing latent security risks in Kubernetes clusters (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for assessing latent security risks in Kubernetes clusters, the method comprising:
   selecting a service account from a plurality of service accounts defined in namespaces of a Kubernetes cluster;
   binding a role to the selected service account based on predetermined role-binding data;
   determining if the role meets at least one of a first, second, and third conditions based on predetermined role data defining permitted operations for roles, the first condition being that the role can receive secret tokens for pods within a namespace of the namespaces, the second condition being that the role can perform execution operation to other pods, and the third condition being that the role can create DaemonSet, Deployment, StatefulSet, and additional pods on the namespace; and
   in response to determining if the role meets the at least one of a first, second, and third conditions, identifying whether privileges of the role exceed privileges of the service account for each condition from among the first, second and third conditions.

2. The computer-implemented method of claim 1, wherein, when the role meets the first condition or the third condition, identify one or more service accounts of the plurality of service accounts on the namespace corresponding to the role which meets the first condition or the third condition based on the role-binding data.

3. The computer-implemented method of claim 2, wherein, when the role meets the second condition, identify one or more service accounts of the plurality of service accounts used in the other pods.

4. The computer-implemented method of claim 3, further comprising triggering an alert when the privileges of the role exceed the privileges of the service account.

5. The computer-implemented method of claim 1, wherein the first condition suggests that the role can pretend to be any of the plurality of service accounts on the namespace.

6. The computer-implemented method of claim 1, wherein the second condition suggests that the role can pretend to be the selected service account used in the pod.

7. The computer-implemented method of claim 1, wherein the third condition suggests that the role can pretend to be any of the plurality of service accounts on the namespace.

8. A computer program product for assessing latent security risks in Kubernetes clusters, the computer program product comprising a computer readable storage medium having program instructions embodied therewith, the program instructions executable by a computer to cause the computer to:
    select a service account from a plurality of service accounts defined in namespaces of a Kubernetes cluster;
    bind a role to the selected service account based on predetermined role-binding data; and
    determine if the role meets at least one of a first, second, and third conditions based on predetermined role data defining permitted operations for roles, the first condition being that the role can receive secret tokens for pods within a namespace of the namespaces, the second condition being that the role can perform execution operation to other pods, and the third condition being that the role can create DaemonSet, Deployment, StatefulSet, and additional pods on the namespace; and
    in response to determining if the role meets the at least one of a first, second, and third conditions, identifying whether privileges of the role exceed privileges of the service account for each condition from among the first, second and third conditions.

9. The computer program product of claim 8, wherein, when the role meets the first condition or the third condition, identify one or more service accounts of the plurality of service accounts on the namespace corresponding to the role which meets the first condition or the third condition based on the role-binding data.

10. The computer program product of claim 9, wherein, when the role meets the second condition, identify one or more service accounts of the plurality of service accounts used in the other pods.

11. The computer program product of claim 10, wherein an alert is triggered when the privileges of the role exceed the privileges of the service account.

12. The computer program product of claim 8, wherein the first condition suggests that the role can pretend to be any of the plurality of service accounts on the namespace.

13. The computer program product of claim 8, wherein the second condition suggests that the role can pretend to be the selected service account used in the pod.

14. A computer-implemented method for determining unintended expansion of privileges for all service accounts defined in all namespaces on a Kubernetes cluster, the method comprising:
    identifying a plurality of roles which a service account defined in a namespace of a Kubernetes cluster is binding to;
    identifying roles from the plurality of roles that meet one of first, second, or third conditions;
    identifying a plurality of service accounts that the roles can pretend to be;
    repeating all the identifying steps to determine all service accounts and roles pretended by the service account; and
    triggering an alert when privileges of the plurality of roles exceed privileges of the plurality of service accounts for each condition from among the first, second and third conditions.

15. The computer-implemented method of claim 14, wherein the first condition pertains to permission to GET secret.

16. The computer-implemented method of claim 15, wherein the first condition suggests that the role can pretend to be any of the plurality of service accounts on the namespace.

17. The computer-implemented method of claim 16, wherein the second condition pertains to permission to CREATE pods/exec.

18. The computer-implemented method of claim 17, wherein the second condition suggests that the role can pretend to be the service account used in the pod.

19. The computer-implemented method of claim 18, wherein the third condition pertains to permission to CREATE daemonset, deployment, statefulset, and pod.

20. The computer-implemented method of claim 19, wherein the third condition suggests that the role can pretend to be any of the plurality of service accounts on the namespace.

* * * * *